Jan. 19, 1965  J. R. CHAPIN  3,165,879
BERRY PICKING APPARATUS
Filed July 19, 1963  3 Sheets-Sheet 1

INVENTOR.
JACK R. CHAPIN
BY Kimmel & Crowell
ATTORNEYS.

INVENTOR.
JACK R. CHAPIN

Jan. 19, 1965  J. R. CHAPIN  3,165,879
BERRY PICKING APPARATUS
Filed July 19, 1963  3 Sheets-Sheet 3

INVENTOR.
JACK R. CHAPIN
BY Kimmel & Crowell
ATTORNEYS.

United States Patent Office 3,165,879
Patented Jan. 19, 1965

3,165,879
BERRY PICKING APPARATUS
Jack R. Chapin, Rte. 2, Box 135, Salem, Oreg.
Filed July 19, 1963, Ser. No. 296,346
12 Claims. (Cl. 56—330)

This invention relates to a berry picking apparatus and has as its primary object the provision of an improved apparatus for picking, conveying and boxing berries of a type found on low-growing bushes, and commercially cultivated in aligned rows.

A further object of the invention is the provision of a device of this character for the picking of commercially grown berries known as cane berries, and including a variety of blackberries, bosenberries, nectar berries, loganberries, and some varieties of raspberries.

An important object of the invention is the provision of an apparatus of this character which will pick the berries without bruising or damaging the same, and wherein the picking is effectuated by the shaking of individual bushes, such shaking in turn being created by alternate opposite blasts of air and vacuum, and without mechanical contact with the bushes.

A further object of the invention is the provision of an improved pneumatic system for effectuating such alternate air and vacuum blasts.

Still another object of the invention is the provision of an improved means for catching the berries so shaken from the bushes, directing the same to conveyors, the conveyors in turn carrying the berries to a position where they may be conveniently boxed, and including mechanisms for cleaning the berries and separating the trash therefrom.

Still another object of the invention is the provision of a device of this character including improved means for directing the alternate blasts of air and vacuum to opposite sides of the bushes, including longitudinally disposed vertically extending rows of baffles on opposite sides of the air-directing tunnels.

A further object of the invention is the provision of a berry picker of this character which is self-propelled, readily steerable, and which may be directed down individual rows of bushes, effectively to pick the ripe fruit from all the bushes in a single row, without the necessity of stopping or turning the apparatus.

A further object of the invention is the provision of a device of this character which is sturdy and durable in construction, reliable and efficient in operation, and relatively simple and inexpensive to manufacture, utilize and operate.

Still other objects reside in the combinations of elements, arrangements of parts, and features of construction, all as will be more fully pointed out as the description of the invention proceeds, and shown in the accompanying drawings wherein there is illustrated a preferred embodiment of this inventive concept.

In the drawings.

Similar reference characters refer to similar parts throughout the several views of the drawing.

Figures 1, 4:
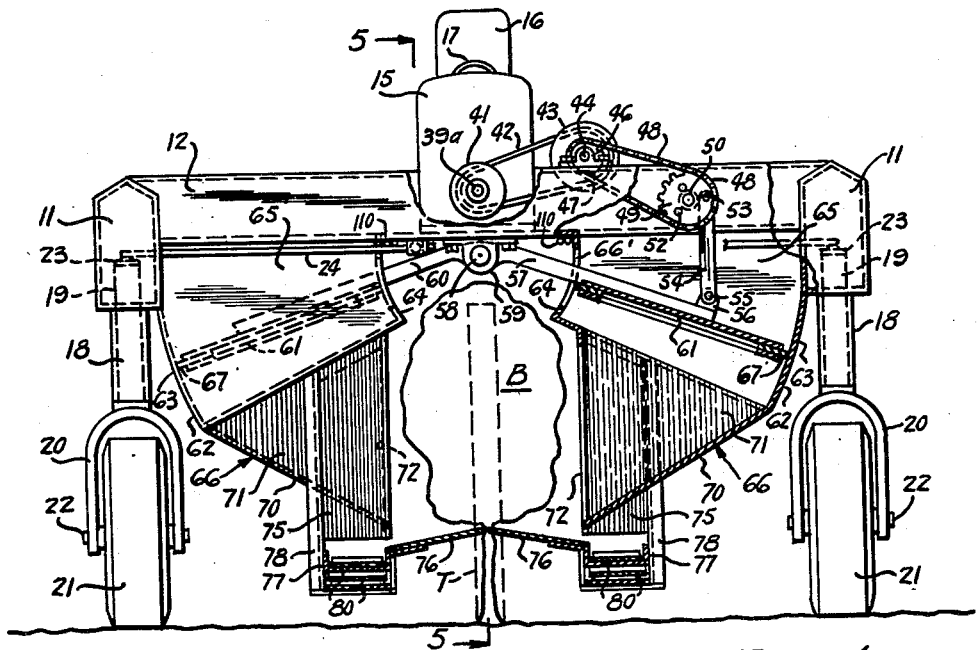
FIGURE 1 is a front view, partially in elevation, and partially in section, of one form of berry picker embodying the instant inventive concept.
FIGURE 4 is a top plan view taken substantially along the line 4—4 of FIGURE 2, as viewed in the direction indicated by the arrows.

Having reference now to the drawings in detail, the apparatus of the instant invention is generally indicated at 10 and comprises a top frame including longitudinally extending side supporting members 11 which are connected by a box-like transverse front supporting member 12 and a similar rear supporting member 13. The frame members are connected together in any desired conventional manner. A central platform 14 extends between the front and rear frame members 12 and 13 and has mounted thereon an internal combustion engine 15 of any desired conventional type, adjacent which is located a driver's seat 16, in proximity to a steering wheel 17 and the usual motor controls of conventional nature (not shown).

Tubular supports 18 depend from the forward end of each side frame member 11, and carry internally rotatable posts 19, which at their lower end carry forks 20, between which are mounted wheels 21 on axles 22. Rearwardly extending lugs 23 are fixed to the top of each post 19, and connected to a transversely extending steering rod 24, which is adapted to be movel linearly through a gear connection 25. The gear connection 25 is in turn rotated by a shaft 26 which is connected through universal joints 27 and 28 and the steering rod 29 is connected to steering wheel 17, the steering mechanism being conventional in nature, but operable effectively to rotate the posts 19 and consequently steer the front wheels 21.

Drive wheels supporting posts 30 depend from the rear end of each side support 11 and carry at their lower ends fixed forks 31 which in turn carry drive wheels 32 mounted on axles 33. Each of axles 33 has mounted thereon a sprocket 34 and from each sprocket 34 a drive chain 35 extends to a sprocket 36 mounted on a transverse drive axle 37. Each axle 37 extends into a conventional centrally disposed differential mechanism 38 carried interiorly of the rear transverse support 13. The differential 38 in turn is driven through a drive shaft 39 which extends into the transmission 40 of internal combustion engine 15.

The forward end 39a of the drive shaft 39 carries a groove pulley or flywheel 41 which is connected by means of a belt 42 to a second groove pulley 43, the latter being mounted on a longitudinally extending rotatable shaft 44 which is journaled in bushings 45 and 46 carried by front and rear transverse members 12 and 13, respectively.

The shaft 44 carries front and rear sprockets 47, each of which is connected by means of a chain 48 to a sprocket 49 which is carried by a stub axle 50 mounted in the supporting bracket 51, one bracket 51 being secured to the rear of transverse front member 12, and the other bracket being connected correspondingly to the forward end of rear transverse frame support 13.

Each sprocket 49 is provided with a plurality of radial openings 52, each opening disposed at a different distance from the rotational axis of the sprocket. In a selected opening 52, a pin 53 pivotally secures one end of a pitman 54. The other end of each pitman 54 is pivotally secured as by a pin 55 to a lug 56 carried by a transversely extending rocker arm 57. Each rocker arm 57 is connected to a centrally disposed rocker shaft 58 which is journaled in bearing 59 carried by the underside of platform 14.

Each rocker arm 57 is aligned with an oppositely disposed rocker arm 60, the arrangement being such that as the rocker arms 57 are moved downwardly by their respective pitmans 54, the opposite rocker arms 60 move upwardly, and vice versa, for a purpose to be more fully described hereinafter.

Rocker arms 57 and 60, respectively, are fixedly connected to enclosed plunger plates 61 which are movable within housings 62 located on opposite sides of centerplate 14. Since the plates and housings are identical with the exception of the connection of the rocker arms 57 to the pitmans 54, similar reference characters will be used throughout. Each housing includes an arcuate rear wall 63 and a slotted arcuate front wall 64, a top wall 65 and a bottom wall generally indicated at 66. End plates 65 serve to seal the plunger assemblies, and gaskets 67 are positioned peripherally about each of the plunger plates 61.

Suitable slots 66 are provided in front wall 64 for the accommodation of rocker arms 57 and 60.

Figure 2:
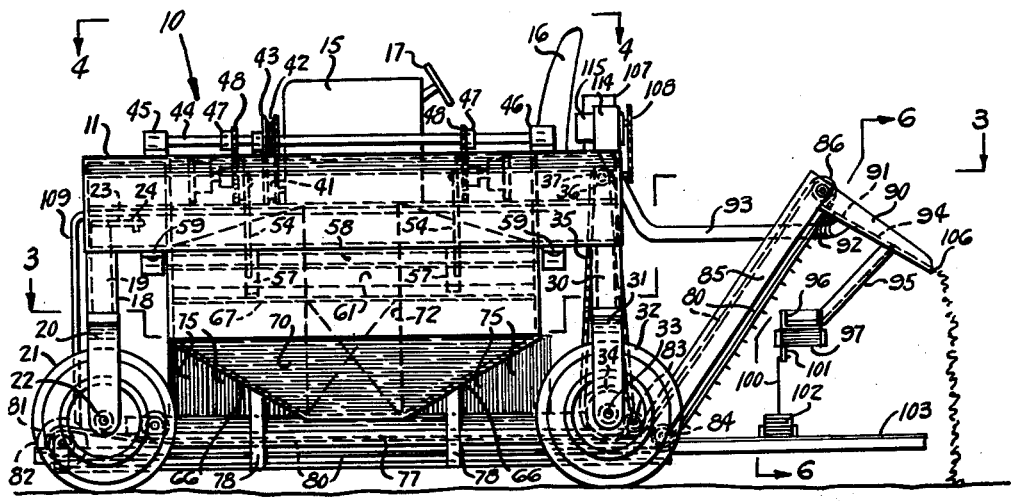
FIGURE 2 is a side elevational view of the apparatus of FIGURE 1, certain concealed portions thereof being indicated in dotted lines.
Figure 3:
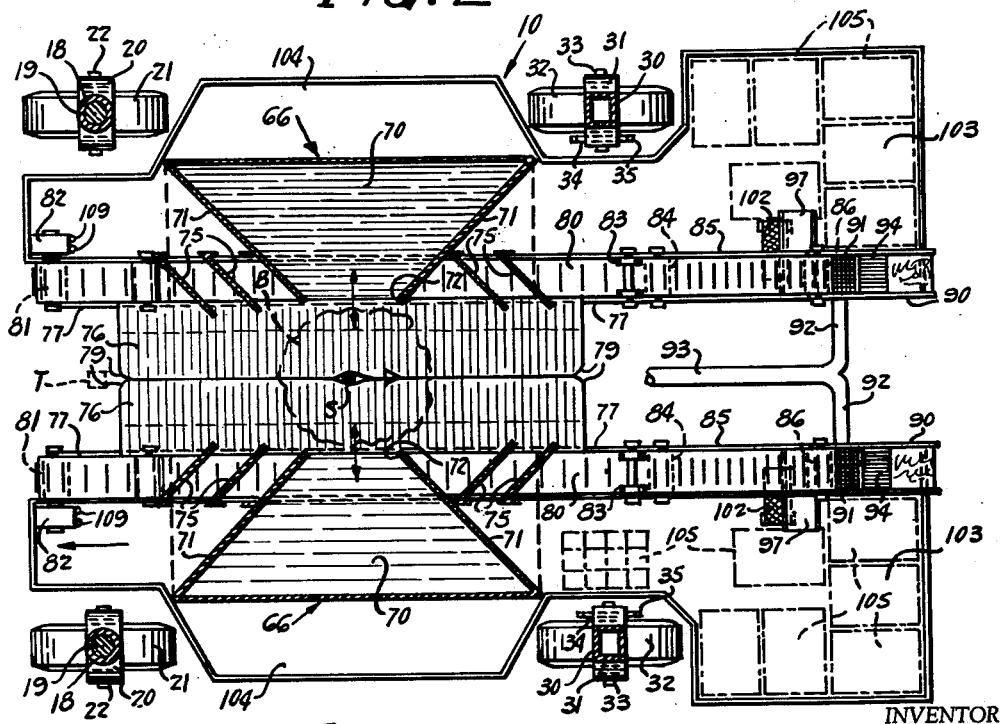
FIGURE 3 is a sectional view taken substantially along the line 3—3 of FIGURE 2, as viewed in the direction indicated by the arrows.
Figure 5:
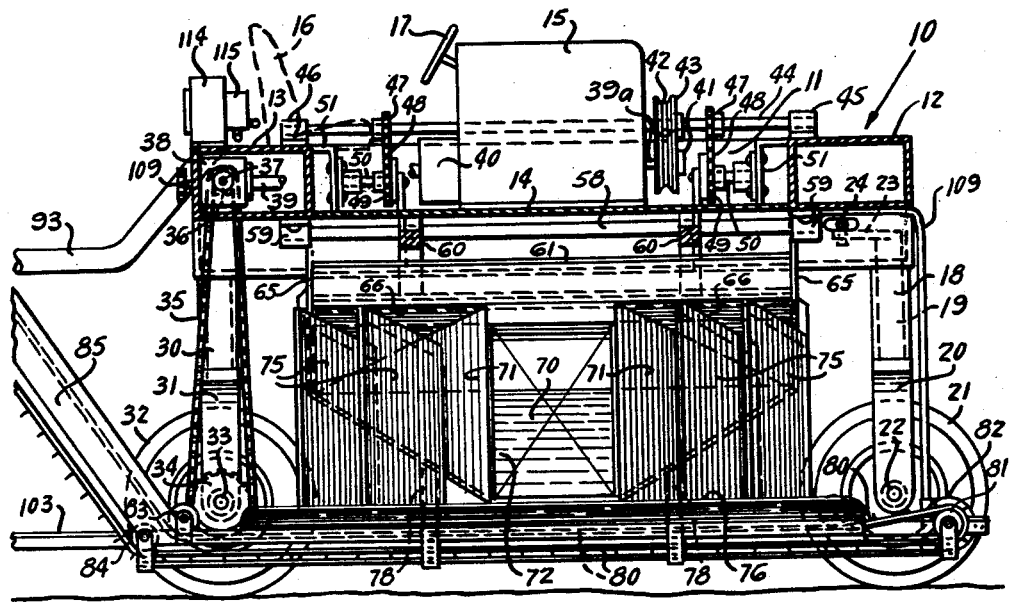
FIGURE 5 is a sectional view taken substantially along the line 5—5 of FIGURE 1, as viewed in the direction indicated by the arrows.

Each of bottom walls 66 includes a downwardly inclined bottom portion 70 which is tapered as best shown in FIGURES 2, 3 inwardly toward the center of the apparatus, and converging in the walls 71, the bottom wall 70 and end wall 71 defining wind tunnels having oppositely disposed openings 72 through which air is alternately forced by the plunger plates 61. The opening 52 to which the pitmans 54 are connected defines the length of the pitman stroke, and hence the arc of movement of the plunger plates 61, so that the force of the wind extruded through the wind tunnel openings 72 may be suitably varied. Thus as the apparatus passes over a berry bush B when the openings 72 are on opposite sides thereof, the bush will be oscillated rapidly in accordance with the speed of movement of the plates 61, by the drafts of air and vacuum alternately directed against opposite sides of the bush to shake the same and causes the berries to fall therefrom.

Rearwardly inclined flexible baffles 75 are positioned forwardly and rearwardly of the openings 72, and by engaging the opposite sides of the bush B as the apparatus passes thereover serve to first align the bush and secondarily cause the same to stop shaking after the apparatus has passed.

Berries falling from the bush B are caught on guide plates 76, which are secured to the upper portions of channels or troughs 77, varied by supports 78 depending from the underside of bottom plates 70. The berry guide plates 76 are comprised of flexible resilient material such as rubber or plastic, and are so disposed that the stem S of the bush B may pass therebetween, as may guide stakes or supports T for the bushes. The plates are in normally abutting relation and have their corners cut away as at 79 to permit the stakes and stems to pass readily therebetween.

Each channel 77 carries a cleated endless conveyor belt 80, which extends at its forward end over a roller 81, each roller 81 being driven by a fluid motor 82. At the rear of each channel 77 each belt passes between upper and lower guide rollers 83 and 84, respectively, into an upwardly inclined channel or trough 85, the trough being provided at its upper end with a roller 86, over which the endless belt passes and returns.

Figure 6:
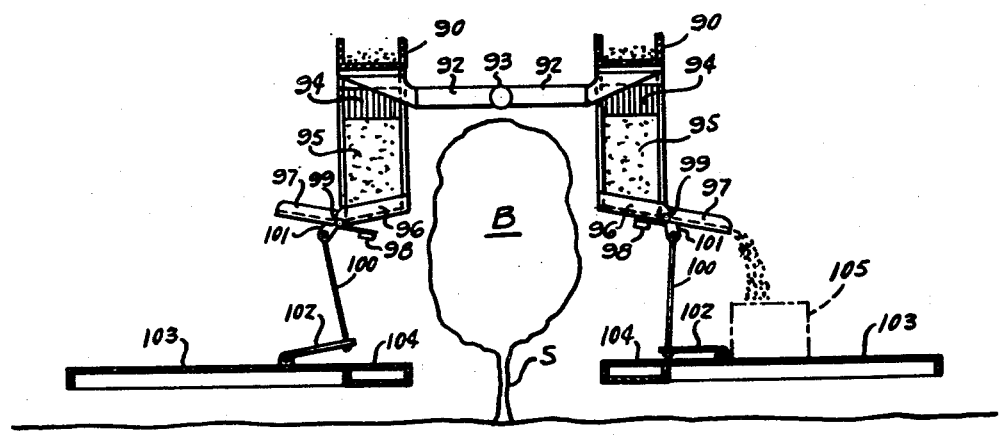
FIGURE 6 is a sectional view taken substantially along the line 6—6 of FIGURE 2, as viewed in the direction indicated by the arrows.

Depending guide troughs 90 extend from the upper end of each channel 85 and are provided with first grids 91 of relatively fine construction beneath which are positioned air lines 92 which are supplied with air from a common duct 93. Relatively large grids 94 are positioned below the grids 91, and it is through these latter grids that the berries pass in the troughs 95 and thence into receptacles 96. Each receptacle 96 has a bottom opening which is normally closed by a chute 97 having a counterweight 98 at one end thereof, the chutes being pivotally mounted as at 99 (see FIG. 6 on the bottom of receptacles 96). Operating rods 100 pivotally connected at one end to lugs 101 carried by plates 97 are connected at their opposite ends to foot pedals 102 which are in turn pivotally mounted on side plates 103 which comprise portions of the lower frame 104 and which serve to support berry boxes 105 into which the berries may fall. The berries carried by the conveyor belt 80 after being shaken from the bush by the reciprocating air from wind tunnels 72 onto plates 76 are cleaned by air passing through the small grids 91 and the trash falls out of the end of downwardly inclined chute 90 as indicated at 106.

A hydro pump 107 mounted on rear support 13 is driven through a chain and sprocket connection 108 from a shaft 109 extending from the rear of differential 38, and supplies air through a line 110 to the hydro motors 82 which drive conveyor belts 80. Similarly, the lines 111 and 112 extend from the engine manifold 113 to a blower 114 and a hydro motor 115, the latter supplying air to the line 93 for cleaning the berries.

From the foregoing the use and operation of the apparatus should now be readily apparent. The internal combustion engine 15 is started and the device is steered by means of the front wheels 21, steering wheel 17 into alignment of a row of berry bushes to be picked. Movement of the device linearly along the row causes the stem of each bush to enter the space between the guide plates 76, with the baffle 75 serving to steady the bush until it reaches a position between the wind tunnel openings 72. At this time alternate opposite blasts of air and vacuum occasioned by the alternate downward and upward movement of the plates 61 cause rapid shaking or vibration of the bush. The movement of the plates is as previously explained occasioned through the pitman 55 and the chain and sprocket drive from shaft 44, the latter in turn being driven by the belt 42 through the motor rotated pulley 41 and the pulley 43.

The berries fall onto the guide plates 76, and roll down the slight incline onto the oppositely disposed conveyor belts 80. The conveyor belts in turn carry the berries upwardly to the top of chute 90 down which they roll, to be cleaned by an air blast through fine grid 91 from pipes or conduits 92, and the berries then fall through chute 95 where they are retained by the closure plates 97 until such time as the foot pedals 102 are depressed and permit berries to fall into boxes 105. As the device passes down the row the baffles 75 to the rear of the wind tunnel opening steady the bush so that further oscillation or shaking after the apparatus is passed will be reduced to a minimum. The process is repeated as the apparatus approaches each bush.

From the foregoing it will now be seen that there is herein provided an improved berry picking apparatus which accomplishes all the objects of this invention, and others, including many advantages of great practical utility and commercial importance.

As many embodiments may be made of this inventive concept, and as many modifications may be made in the embodiment hereinbefore shown and described, it is to be understood that all matter herein is to be interpreted merely as illustrative and not in a limiting sense.

I claim:

1. Berry picking apparatus comprising a main frame, spaced front and rear legs at the front and rear corners of said main frame supporting the frame a substantial distance above the ground and defining a longitudinally extending central channel, an engine and steering means supported by said frame, drive wheels carried by said rear legs operatively connected to said engine, steerable wheels carried by said front legs and operatively connected to said steering means, plates defining confronting air tunnels on opposite sides of said channel, plunger means connected with each tunnel, and means alternately operating each plunger means to force alternate blasts of air against a berry bush in said channel from opposite sides to shake said bush to dislodge berries therefrom.

2. The structure of claim 1 wherein said bellows comprise arcuate inner and outer walls, end walls, a bottom wall assembly defining said air tunnels, a plunger plate reciprocable between said arcuate walls, a central longitudinally extending rocker shaft depending from said frame, rocker arms extending from opposite sides of said shaft and connected to said plunger plate for alternate raising and lowering of each plate, sealing gaskets extending about each plate, and a driving connection between said engine and said rocker shaft for rocking the same.

3. The structure of claim 2 wherein two rocker arms are connected to each plate, a pitman is pivotally connected to each of the two arms connected to one plate, a sprocket is connected to the opposite end of each pitman, mounting means are provided for each sprocket on said frame, a rotatable shaft extends longitudinally of said frame in offset relation to said rocker shaft, additional sprockets are carried by said rotatable shaft aligned with said first mentioned sprockets, drive chains connect aligned sprockets, and belt and pulley means are provided connecting said rotatable shaft with said engine for rotation thereby.

4. The structure of claim 3 wherein each of said first mentioned sprockets is provided with a plurality of radial openings, said pitmans being selectively connectable with one of said opening to vary the effective stroke of the pitman and hence the movement of said plunger plate and the force of the air blast delivered thereby.

5. The structure of claim 2 wherein said bottom wall assemblies each comprise, a downwardly and inwardly inclined bottom plate having converging ends defining the bottom of the wind tunnel opening and downwardly and inwardly converging end plates defining the sides of the wind tunnel opening, the top of said end plates being connected to the bottoms of said end walls, and the rear upper end of said bottom plate being connected to the bottoms of said outer arcuate walls, with the bottom of said inner arcuate wall defining the top of the wind tunnel opening.

6. Berry picking apparatus comprising a main frame, spaced front and rear legs at the front and rear corners of said main frame supporting the frame a substantial distance above the ground and defining a longitudinally extending central channel, an engine and steering means supported by said frame, drive wheels carried by said rear legs operatively connected to said engine, steerable wheels carried by said front legs and operatively connected to said steering means, plates defining confronting air tunnels on opposite sides of said channel, plunger means connected with each tunnel, means alternately operating each plunger means to force alternate blasts of air against a berry bush in said channel from opposite sides to shake said bush to dislodge berries therefrom, and elongated troughs extending along the opposite lower sides of said channel, an endless conveyor belt in each trough, means operable by said engine to drive said conveyor belts, and oppositely disposed inwardly upwardly inclined flexible resilient berry guide plates extending along the sides of each trough and meeting centrally adapted to pass on opposite sides of the stem of a bush to catch berries shaken therefrom and guide the same onto said conveyor belts.

7. The structure of claim 6 wherein said means for driving said conveyor belts comprise individual motors mounted adjacent each belt, a hydro pump driven by said engine and a fluid connection between said hydro pump and said motors.

8. Berry picking apparatus comprising a main frame, spaced front and rear legs at the front and rear corners of said main frame supporting the frame a substantial distance above the ground and defining a longitudinally extending central channel, an engine and steering means supported by said frame, drive wheels carried by said rear legs operatively connected to said engine, steerable wheels carried by said front legs and operatively connected to said steering means, plates defining confronting air tunnels on opposite sides of said channel, plunger means connected with each tunnel, means alternately operating each plunger means to force alternate blasts of air against a berry bush in said channel from opposite sides to shake said bush to dislodge berries therefrom, and elongated troughs extending along the opposite lower sides of said channel, an endless conveyor belt in each trough, means operable by said engine to drive said conveyor belts, oppositely disposed inwardly upwardly inclined flexible resilient berry guide plates extending along the sides of each trough and meeting centrally adapted to pass on opposite sides of the stem of a bush to catch berries shaken therefrom and guide the same onto said conveyor belts, and vertically extending rearwardly inclined baffles on opposite sides of said channel in front of and to the rear of said wind tunnels to steady the bushes before and after exposure to the air blasts.

9. Berry picking apparatus comprising a main frame, spaced front and rear legs at the front and rear corners of said main frame supporting the frame a substantial distance above the ground and defining a longitudinally extending central channel, an engine and steering means supported by said frame, drive wheels carried by said rear legs operatively connected to said engine, steerable wheels carried by said front legs and operatively connected to said steering means, plates defining confronting air tunnels on opposite sides of said channel, plunger means connected with each tunnel, means alternately operating each plunger means to force alternate blasts of air against a berry bush in said channel from opposite sides to shake said bush to dislodge berries therefrom, and elongated troughs extending along the opposite lower sides of said channel, an endless conveyor belt in each trough, means operable by said engine to drive said conveyor belts, oppositely disposed inwardly upwardly inclined flexible resilient berry guide plates extending along the sides of each trough and meeting centrally adapted to pass on opposite sides of the stem of a bush to catch berries shaken therefrom and guide the same onto said conveyor belts, and vertically extending rearwardly inclined baffles on opposite sides of said channel in front of and to the rear of said wind tunnels to steady the bushes before and after exposure to the air blasts, said trough having upwardly inclined rear portions, said conveyor belts extending upwardly into said rear portions, and chutes extending downwardly from the top of said rear portions, said chutes having first openings therein, a fine grid covering each first opening, means for directing an upward blast of air through said fine grids to clean berries passing thereover, said chutes having second openings beyond said first opening, coarse grids covering said second opening with berries being adapted to pass through said coarse grids, and trash separated from the berries passing out the lower ends of said chutes.

10. Berry picking apparatus comprising a main frame, spaced front and rear legs at the front and rear corners of said main frame supporting the frame a substantial distance above the ground and defining a longitudinally extending central channel, an engine and steering means supported by said frame, drive wheels carried by said rear legs operatively connected to said engine, steerable wheels carried by said front legs and operatively connected to said steering means, plates defining confronting air tunnels on opposite sides of said channel, plunger means connected with each tunnel, means alternately operating each plunger means to force alternate blasts of air against a berry bush in said channel from opposite sides to shake said bush to dislodge berries therefrom, and elongated troughs extending along the opposite lower sides of said channel, and endless conveyor belt in each trough, means operable by said engine to drive said conveyor belts, oppositely disposed inwardly upwardly inclined flexible resilient berry guide plates extending along the sides of each trough and meeting centrally adapted to pass on opposite sides of the stem of a bush to catch berries shaken therefrom and guide the same onto said conveyor belts, and vertically extending rearwardly inclined baffles on opposite sides of said channel in front of and to the rear of said wind tunnels to steady the bushes before and after exposure to the air blasts, said trough having upwardly inclined rear portions, said conveyor belts extending upwardly into said rear portions, and chutes extending downwardly from the top of said rear portions, said chutes having first openings therein, a fine grid covering each first opening, means for directing an upward blast of air through said fine grids to clean berries passing thereover, said chutes having second openings beyond said first opening, coarse grids covering said second opening with berries being adapted to pass through said coarse grids, trash separated from the berries passing out the lower ends of said chutes, and berry box supporting platforms carried by said frame on each side of said channel, beneath said chutes a foot pedal on each platform, a receptacle having an opening therein beneath each coarse grid for the reception of berries, a closure plate for each opening and an operaitve connection between each foot pedal and one of said closure plates.

11. The structure of claim 10 wherein said means for directing an air blast through said fine grids comprises a hydro motor carried by said frame, means connecting said hydro motor with said engine, a blower connected to said hydro motor, and pipes connecting said blower with the underside of said fine grids.

12. In a mobile berry picking apparatus operable to straddle a row of berry bushes,
(1) mechanism including transversely directed and confronting air tunnels,
(2) moving means within each tunnel for creating first a pressure blast of air and then a suction blast of air, and repeating such cycle,
(3) and connective means between said means within each tunnel so constructed and arranged that the means within one tunnel is producing a pressure towards the other tunnel, when the means within the other tunnel is drawing a vacuum from the direction of said one tunnel, and vice versa,
(4) whereby reciprocating movements of air on each side of the berry row located between the tunnels will force the bushes back and forth from side to side and thus dislodge quantities of ripe berries from the bushes.

References Cited by the Examiner
UNITED STATES PATENTS 2,660,021 11/53 McDowell _____ 56—330
3,126,692 3/64 Weygandt et al. _____ 56—330

T. GRAHAM CRAVER, *Primary Examiner.*
RUSSELL R. KINSEY, *Examiner.*